United States Patent [19]
Griffin et al.

[11] 3,738,277
[45] June 12, 1973

[54] PYROTECHNIC APPARATUS TO ASSIST IN THE TRACKING OF AIRCRAFT

[75] Inventors: William C. Griffin, Ridgecrest; Lynn Barker, Kenneth R. Foote, both of China Lake, all of Calif.

[73] Assignee: The United States of America as represented by the Secretary of the Navy

[22] Filed: Nov. 16, 1970

[21] Appl. No.: 89,738

[52] U.S. Cl. .................................. 102/87, 102/66
[51] Int. Cl. ............................................. F42b 13/34
[58] Field of Search .................... 102/87, 90, 66, 6; 60/35.6 RS

[56] References Cited
UNITED STATES PATENTS
3,109,821  11/1963  York et al. .................... 102/90 X
3,298,311  1/1967  Catlin ............................ 102/90
3,431,852  3/1969  Fowler ........................ 102/90 X

*Primary Examiner*—Benjamin A. Borchelt
*Assistant Examiner*—H. J. Tudor
*Attorney*—R. S. Sciascia and Thomas O. Watson, Jr.

[57] ABSTRACT

An apparatus for producing a smoke trail as an acquisition aid to operators of aircraft tracking cameras and tracking radar. A visually detectable trace is produced which enables the tracking operators to locate aircraft that they are required to track for data. The apparatus comprises a housing containing a plurality of pyrotechnic smoke devices suitably connected to a stepping relay so that on each application of a pulse of electricity by the aircraft pilot, the relay will sequentially ignite the pyrotechnic devices thereby forming a smoke trail. The smoke is formed from a mixture of hexachloroethane, zinc oxide, and aluminum.

5 Claims, 1 Drawing Figure

PATENTED JUN 12 1973
3,738,277
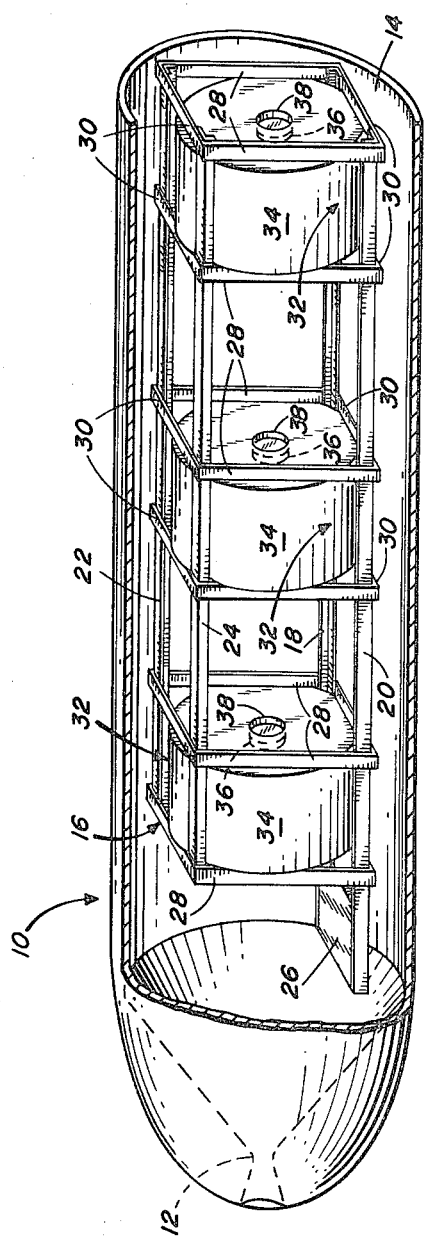
INVENTORS
WILLIAM C. GRIFFIN
LYNN BARKER
KENNETH R. FOOTE
BY Thomas O. Watson Jr.
ATTORNEY

PYROTECHNIC APPARATUS TO ASSIST IN THE TRACKING OF AIRCRAFT

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

The present invention relates generally to pyrotechnic smoke devices and more particularly it pertains to an apparatus for producing a smoke trail as an acquisition aid to operators of aircraft tracking cameras and tracking radar.

In the test and evaluation of aircraft, one of the methods for determining the operating flight characteristics is by observation through visual, photographic or radar tracking means. One prior art method to accomplish this result is to provide the aircraft or missile with an intense light source to facilitate the tracking operation. Another prior art device employs the technique of burning a mixture of an organic dye with a fuel and an oxidizer from a special container within or attached to the aircraft or missile. Still other prior art devices use flash powder which is activated by fuse to produce a flash apparatus for use in signaling operations or in target practice. While such devices have been found satisfactory for the most part, there have been several disadvantages. For example, the devices providing an intense light source or those using organic dyes, fuel and oxidizer are unduly expensive for most tracking operations. In addition, the prior art devices require modification to the aircraft or missile for mounting purposes or additional circuitry has to be provided to actuate the tracking devices.

OBJECTS OF THE INVENTION

Accordingly, it is an object of the present invention to provide an aircraft tracking apparatus which is simply and easily attached to an aircraft without any modification of the aircraft being necessary.

Another object is the provision of a device which utilizes existing aircraft circuitry, is inexpensive to manufacture and safe to use.

A further object of the invention is to provide a portable device which is also jettisonable from the aircraft.

SUMMARY OF THE INVENTION

The general purpose of this invention is to provide a smoke trail as an acquisition aid to photographic and radar operators, wherein no aricraft modifications are needed to employ the inexpensive, portable smoke generators of the present invention. The inventive device may be simply mounted at the existing ordnance station or bomb rack of the aircraft. Also, the existing arming circuit or firing circuit of the aircraft is connected to a stepping relay within the smoke generator container. This allows the pilot to actuate the smoke generators of the present invention in the same manner that a bomb would be armed from the aircraft. In addition, the inventive device is jettisonable from the aircraft, before or after all of the smoke generators have burnt out.

Other objects, advantages and novel features of the invention will become apparent from the following detailed description of the invention when considered in conjunction with the accompanying drawings.

BRIEF DESCRIPTION OF THE DRAWING

The drawing is a diagramatic view, partly in section, of the pyrotechnic tracking apparatus of the present invention.

DETAILED DESCRIPTION OF THE PREFERRED EMBODIMENT

The drawing, which illustrates a preferred embodiment of the smoke producing device, shows a smoke tank or cylindrical container 10 to house the entire assembly. The container 10 has a nozzle 12 formed within the forward end, the aft end 14 thereof being completely open. Fixedly attached within container 10 is a rectangular support assembly 16 formed of aluminum channels. Longitudinal channels 18 and 20 extend beyond longitudinal channels 22 and 24 in a forward direction and mount therebetween a stepping relay or intervalometer 26. Fixedly attached to the longitudinal channels 18, 20, 22 and 24 are a plurality of vertical channels 28 and a plurality of transverse channels 30 arranged to form a plurality of compartments 32. Although the preferred embodiment shows three such compartments, the invention is not so limited, the number being dependent only upon the particular use or need.

Mounted within each of the compartments 32 is a pyrotechnic smoke generator or smoke pot 34, containing the chemicals hexachloroethane, zinc oxide, and aluminum which produce the smoke upon ignition. However, other materials which pyrotechnically form smoke may be used. A suitable electrical ingition device is shown at 36, mounted within a hole 38 formed in each smoke generator 34. Two leads (not shown) are provided for each ignition device 36, one lead being connected to ground and the other lead connected to stepping relay 26.

In operation, the pilot of the aircraft can produce a smoke trail for tracking purposes by actuating the existing firing circuit or arming circuit of the aircraft, which is connected to the stepping relay 26. Upon each application of a pulse of electrical current, the relay 26 will sequentially ignite the smoke generators 34 thereby forming a smoke trail. The ignition sequence is aft-center-forward with each smoke generator 34 providing approximately 5 minutes of smoke at ambient pressure. The nozzle 12 is a novel feature of the present invention as it allows secondary air to enter container 10 which helps to expel the smoke produced out of the aft end 14. In addition, this secondary air also performs the function of keeping container 10 cool and at a safe temperature so that smoke generators 34 will not be ignited prematurely. Of course, the pilot need not ignite all of the smoke generators 34 on one flight pattern. For example, if desired, only one or two may be ignited during one flight pattern, with the remaining ones being ignited for tracking purposes on another pass or flight pattern. In this manner, the apparatus of the present invention provides the pilot with complete flexibility and control. Accordingly, in the embodiment shown, each container 10 can produce a sustained 15 minute smoke trail if each generator 34 is ignited immediatedly after the previous generator burns out. Or if desired, 5 minutes of smoke may be produced, as needed, by the pilot's actuation of the stepping relay 26. Tracking personnel have reported very satisfactory results with the apparatus of the present invention when tracking flights were run at altitudes up to 35,000 feet having slant ranges of 2 miles to 25 miles and with the sky conditions clear and cloudy.

Obviously many modifications and variations of the present invention are possible in the light of the above teachings.

What is claimed is:

1. An apparatus adapted to be mounted on an aircraft to assist in the tracking thereof, which comprises:
   a housing having an opening in the aft end;
   a nozzle formed in the forward end of said housing;
   a plurality of pyrotechnic smoke generators mounted within said housing; and
   means for sequentially actuating said smoke generators to produce a smoke trail.

2. An aircraft tracking apparatus as recited in claim 1, wherein a support assembly is mounted within said housing to support said pyrotechnic smoke generators in a tandem arrangement.

3. An aircraft tracking apparatus as recited in claim 2, wherein said smoke generators each have an electrical ignition device connected to said actuating means.

4. An aircraft tracking apparatus as recited in claim 3, wherein said actuating means is a stepping relay.

5. An aircraft tracking apparatus as recited in claim 4, wherein said pyrotechnic smoke generators contain hexacholorethane, zinc oxide, and aluminum.

* * * * *